(12) United States Patent
Venes et al.

(10) Patent No.: US 9,549,214 B2
(45) Date of Patent: Jan. 17, 2017

(54) CABLE NETWORK GATEWAY WITH DIGITAL DOCSIS/MOCA BRIDGE

(71) Applicant: BROADCOM CORPORATION, Irvine, CA (US)

(72) Inventors: Ardie Venes, Laguna Niguel, CA (US); Donald George McMullin, Laguna Hills, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/530,391

(22) Filed: Oct. 31, 2014

(65) Prior Publication Data

US 2016/0105712 A1  Apr. 14, 2016

Related U.S. Application Data

(60) Provisional application No. 62/061,401, filed on Oct. 8, 2014.

(51) Int. Cl.

| | |
|---|---|
| *H04N 21/4363* | (2011.01) |
| *H04N 21/436* | (2011.01) |
| *H04N 21/4385* | (2011.01) |
| *H04N 21/4402* | (2011.01) |
| *H04N 21/40* | (2011.01) |

(Continued)

(52) U.S. Cl.
CPC .......... *H04N 21/4363* (2013.01); *H04N 7/106* (2013.01); *H04N 21/40* (2013.01); *H04N 21/41* (2013.01); *H04N 21/436* (2013.01); *H04N 21/4385* (2013.01); *H04N 21/43615* (2013.01); *H04N 21/43632* (2013.01); *H04N 21/43637* (2013.01); *H04N 21/440218* (2013.01);

(Continued)

(58) Field of Classification Search
CPC ................................................ H04N 21/43615
See application file for complete search history.

(56) References Cited

U.S. PATENT DOCUMENTS

2005/0003785 A1* 1/2005 Jackson .................... G01S 7/35
455/260
2009/0290659 A1* 11/2009 Petrovic ................. H04H 20/30
375/340

(Continued)

*Primary Examiner* — Justin Shepard
(74) *Attorney, Agent, or Firm* — Garlick & Markison; Edward J. Marshall

(57) ABSTRACT

A cable network gateway receives a downstream broadband signal via service provider cabling at an interface. An Analog to Digital Converter (ADC) converts the downstream broadband signal to a digital downstream broadband signal. A digital filter attenuates an upper spectrum from the digital downstream broadband signal to produce a filtered digitized downstream broadband signal. An in-home communications transceiver produces a digital in-home communications signal that overlaps the upper spectrum. Summing circuitry sums the filtered digitized downstream broadband signal with the digital in-home communications signal to produce a combined digital signal. A Digital to Analog Converter (DAC) converts the combined digital signal to a combined analog signal and an in-home cable interface transmits the combined analog signal via in-home cabling. The downstream broadband signal may be a Data over Cable System Interface Specification (DOCSIS) 3.0/3.1 signal and the digital in-home communications signal comprises a Multimedia over Coaxial Alliance (MoCA) signal.

20 Claims, 5 Drawing Sheets

(51) Int. Cl.
*H04N 21/61* (2011.01)
*H04N 21/41* (2011.01)
*H04N 7/10* (2006.01)

(52) U.S. Cl.
CPC ......... *H04N 21/61* (2013.01); *H04N 21/6106* (2013.01); *H04N 21/6118* (2013.01)

(56) References Cited

U.S. PATENT DOCUMENTS

| | | | |
|---|---|---|---|
| 2010/0100918 A1* | 4/2010 | Egan, Jr. | H04N 7/104 725/111 |
| 2011/0271313 A1* | 11/2011 | Urban | H04L 12/2861 725/109 |
| 2012/0023535 A1* | 1/2012 | Brooks | H04N 21/222 725/110 |
| 2012/0106964 A1* | 5/2012 | Sniezko | H04B 10/25751 398/67 |
| 2013/0063608 A1* | 3/2013 | Tierney | H04L 43/08 348/192 |
| 2014/0181883 A1* | 6/2014 | Schroeder | H04N 21/436 725/116 |

* cited by examiner

CABLE NETWORK GATEWAY WITH DIGITAL DOCSIS/MOCA BRIDGE

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional Application No. 62/061,401, entitled "Cable Network Gateway with Digital DOCSIS/MoCA Bridge," filed Oct. 8, 2014, which is hereby incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND

Technical Field

This disclosure relates generally to communications and more particularly to cable network communications.

Description of Related Art

Communication systems are well known and include wireless networks, wired networks, satellite networks, and various other types of networks. Wired networks use wiring or fiber to direct communications between communication devices while wireless networks support communications wirelessly. Cable networks are a type of wired network that have been in existence for many years. Cable networks include an interconnected system of coaxial cables, which is referred to as cable plant or service provider cabling. The cable plant services communications between service provider equipment and customer located equipment and provides an excellent signal path between such devices, as compared to other media types. When originally constructed, cable networks serviced only broadcast television signals. As the Internet became popular, the cable networks were then used to provide Internet access. Now, cable networks are used to service broadcast television, Internet access, video-on-demand, streamed music, and other types of communications. The Data over Cable System Interface Specification (DOCSIS) standards govern many communications between service provider equipment and customer located equipment.

With the advent and growth of cable networks, in order to distribute communications within the home, most homes included in-home cabling. Originally, in-home cabling was only used to distribute broadcast television within the home (or other premises). Now, in-home cabling also supports communications between devices located within the home, e.g., data networking, network storage, shared printing devices, video streaming between devices, and other types of intra-home communications. The Multimedia over Coax Alliance (MoCA) has promulgated standards to support intra-home communications that use premises cabling. MoCA standards were promulgated to coexist with DOCSIS standards. Ever increasing demand for high speed internet access, streaming video, and streaming audio will place demands on both the service provider cabling and premises cabling, which will likely result in conflicting communications requirements.

BRIEF DESCRIPTION OF THE SEVERAL VIEWS OF THE DRAWING(S)

DETAILED DESCRIPTION OF THE DISCLOSURE

Figure 1:
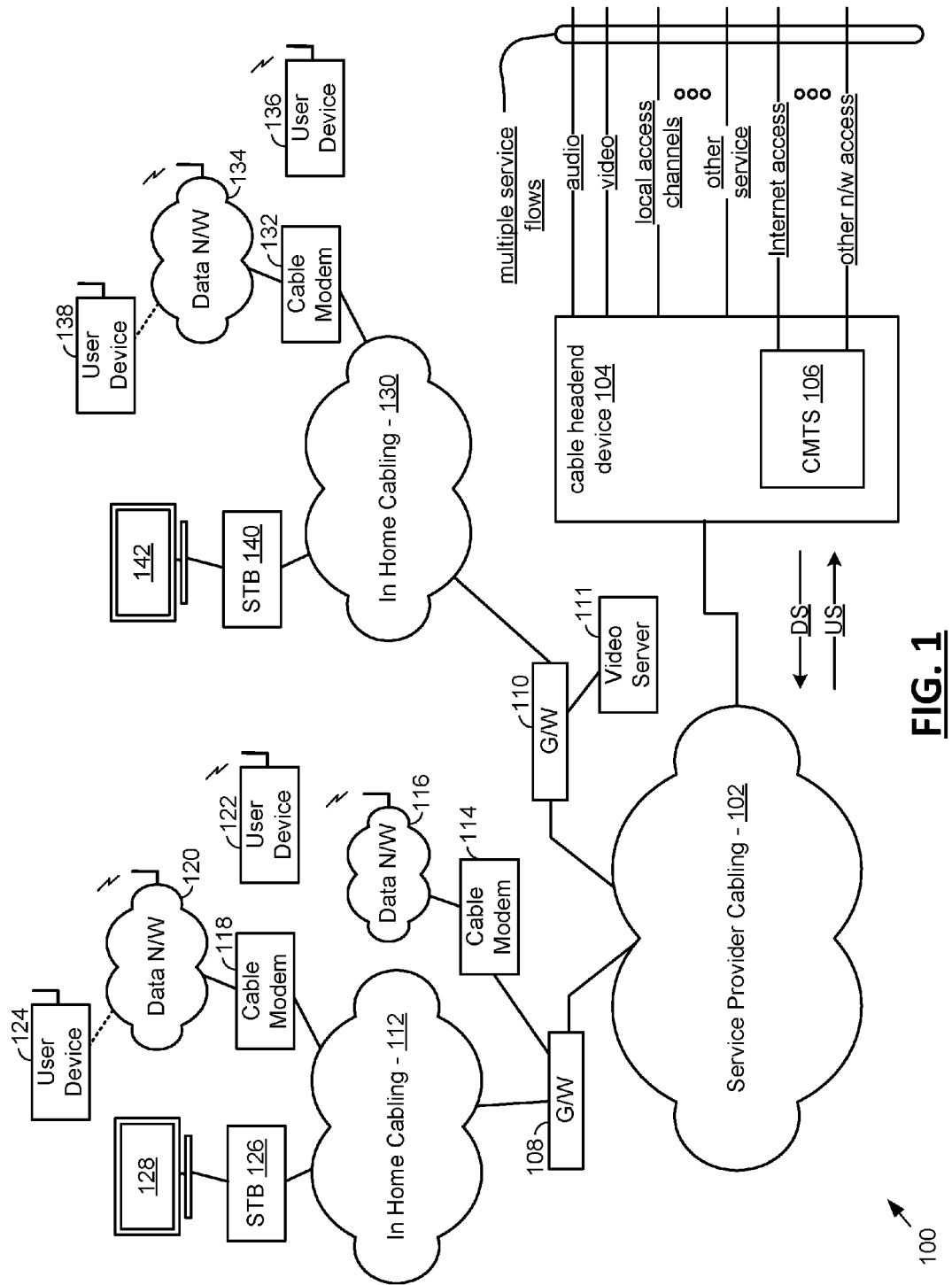
FIG. 1 is a system diagram illustrating a cable network including service provider equipment and in-home equipment constructed and operating according to one or more embodiments of the present disclosure.

FIG. 1 is a system diagram illustrating a cable network including service provider equipment and in-home equipment constructed and operating according to one or more embodiments of the present disclosure. A cable headend device 104 provides service to a plurality of customers via service provider cabling 102. The service provider cabling 102 is generally referred to as cable plant and may be implemented, at least in part, as a hybrid fiber-coaxial (HFC) network (e.g., including various wired and/or optical fiber communication segments, light sources, light or photo detection complements, etc.).

A single cable headend device 104 can service hundreds or thousands of customers via the service provider cabling 102 (only two serviced homes/premises are shown in FIG. 1 for brevity). The cable headend device 104 supports a number of service flows such as audio, video, local access channels, as well as any other services. The cable headend device 104 also services one or more cable modem termination systems (CMTS) 106 that provide(s) network service (e.g., Internet, other network access, etc.) to a plurality of customer devices by exchanging digital signals with cable modems 114, 118 and 132 of subscribers. Generally, downstream (DS) information flows from the CMTS 106 to the subscribers and upstream (US) information flows from the subscribers to the CMTS 106.

The cable headend device 104 interfaces with customer premises equipment, including cable network gateways 108 and 110, cable modems 114, 118, and 132, and set top boxes (STBs) 126 and 140, each of which is located in a home or other premises of a subscriber. STBs 126 and 140 support coupled audio visual systems 128 and 142, respectively. In home cabling 112 and 130 supports communications for the STBs 126 and 140 and the cable modems 114, 118 and 132 via the cable network gateways 108 and 110. Generally, the cable headend device 104 broadcasts audio and video including local access channels to the STBs 126 and 140 and other devices within the home capable of interfacing with the cable headend device 104. Services also include video on demand, audio on demand, and may include Over the Top services.

The CMTS 106 provides Internet access to the cable modems 114, 118, and 132. Cable modems 114, 118, and 132 in turn support data networks 116, 120, and 134, respectively, which service user devices 122, 124, 136, and 138. These data networks may be Local Area Networks (LANs), Wireless Local Area Networks (WLANs), Personal Area Networks, or other types of networks. The data networks may support streaming of audio and video via supported services that stream audio and data via the Internet, e.g., Pandora®, Netflix®, Hulu®, etc.

The cable headend device 104 operates according to a standardized communication protocol such as the Data Over Cable Interface Specification (DOCSIS) 2.0, 3.0, 3.1 and/or predecessor/successor standards. In such case, the STBs 126 and 140 must support such standardized communication protocol(s). Further, the cable network gateways 108 and 110 may also support the Multimedia over Coaxial Access (MoCA) standardized communication protocol. With such operations, one or more of the cable network gateways 108 and 110 may support audio video storage (via video server 111, for example) and streaming to devices within the home. Further, with such operations, one or more of the devices within the home may stream to other devices in the home.

According to the present disclosure, the cable headend device 104 supports communications that create operational conflicts with communications within the home. Thus, according to the present disclosure the cable network gateways 108 and 110 receive a downstream broadband signal via service provider cabling 102, e.g., a DOCSIS 3.0 or 3.1 signal (and/or any version that is inconsistent with DOCSIS 2.0 and/or predecessor standard). The cable network gateways 108 and 110 then convert the downstream broadband signal to a digital downstream broadband signal. Then, the cable network gateways 108 and 110 low pass filter the digital downstream broadband signal to produce a filtered digitized downstream broadband signal. The cable network gateways 108 also produce or service a digital in-home communications signal, e.g., a MoCA signal that overlaps the upper spectrum. The cable network gateways 108 and 110 then sum the filtered digitized downstream broadband signal with the digital in-home communications signal to produce a combined digital signal, convert the combined digital signal to a combined analog signal, and transmit the combined analog signal via in-home cabling 112 and 130, respectively, for receipt by other devices within the home, e.g., STBs 126 and 140 and/or cable modems 118 and 132.

Figure 2A:
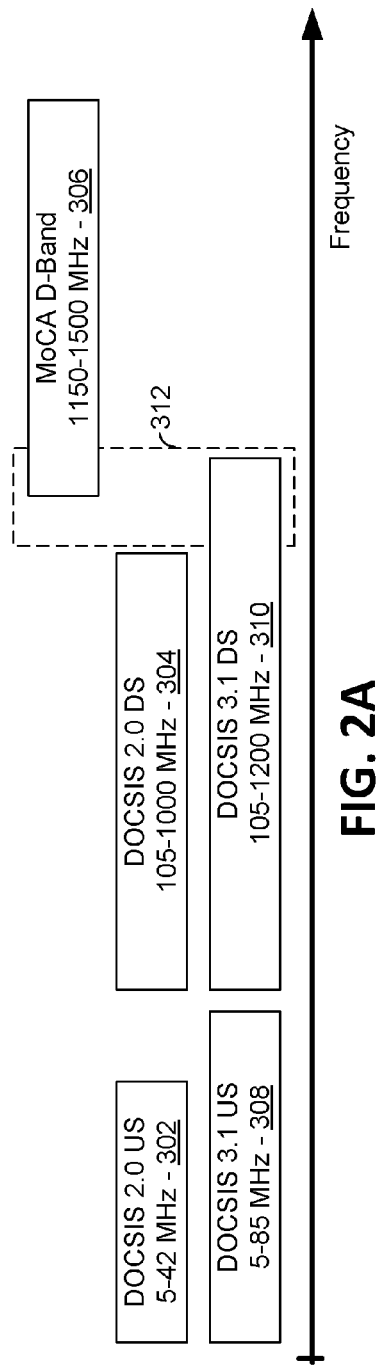
FIG. 2A is a frequency plan illustrating frequency ranges of various cable network standards.

FIG. 2A is a frequency plan illustrating frequency ranges of various cable network standards. Referring to both FIG. 1 and FIG. 2A, a prior cable headend device may have supported the DOCSIS 2.0 Upstream (US) and DOCSIS 2.0 Downstream (DS) signaling format. In such case, the DOCSIS 2.0 US signals 302 extended from 5 to 42 MHz. The DOCSIS 2.0 DS signals 304 extended from 105-1000 MHz. A prior cable network gateway or other device within a home or premises in this configuration also may have supported MoCA D-Band communications 306 that extended from 1150 to 1500 MHz. In such case, no conflict existed between the occupied frequency bands of DOCSIS 2.0 (302 and 304) and MoCA D-Band 306.

With a newer cable network standard, the DOCSIS 3.1 standard, the DOCSIS 3.1 (DOCSIS 3.0 or DOCSIS version with similar channelization) US signals 308 extend from 5-85 MHz. Further, the DOCSIS 3.1 DS signals 310 extend from 105-1200 MHz. The frequency range of the DOCSIS 3.1 DS signals 310 therefore overlaps with the MoCA D-Band signals 306 in an upper spectrum 312. Because prior cable network gateways passed all DOCSIS signals from the service provider cabling 102 to in home cabling 112 and 130, a conflict exists with differing signals both occupying the upper spectrum 312. Thus, as was described with reference to FIG. 1, the cable network gateway of the present disclosure blocks this upper spectrum from passing from the service provider cabling 102 to the in home cabling 112 or 130 to prevent the conflict in signaling.

Figure 2B:
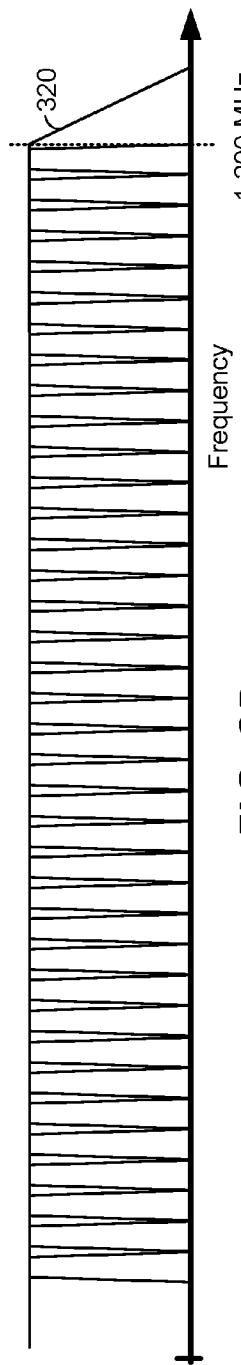
FIG. 2B is a graph illustrating the channelization of a DOCSIS 3.1 downstream signal.

FIG. 2B is a graph illustrating the channelization of a DOCSIS 3.1 downstream signal. As was previously described, the DOCSIS 3.1 DS signal 310 occupies the frequency band of 105-1200 MHz and includes 183 channels, as compared to the 149 channels of the DOCSIS 2.0 DS signal 304. The DOCSIS 3.1 DS signal 310 has an approximate power spectrum 320 of P(total)=15 dBmV+10 log(183 channels)=38 dBmV. In general, the upper portion of the DOCSIS 3.1 DS signal 310 carries newer service offerings, such as video on demand, High Efficiency Video Coding (HEVC) signals, and other newer service offerings. DOCSIS 3.0 and/or versions later than 3.1 may also have similar channelization.

Figure 2C:
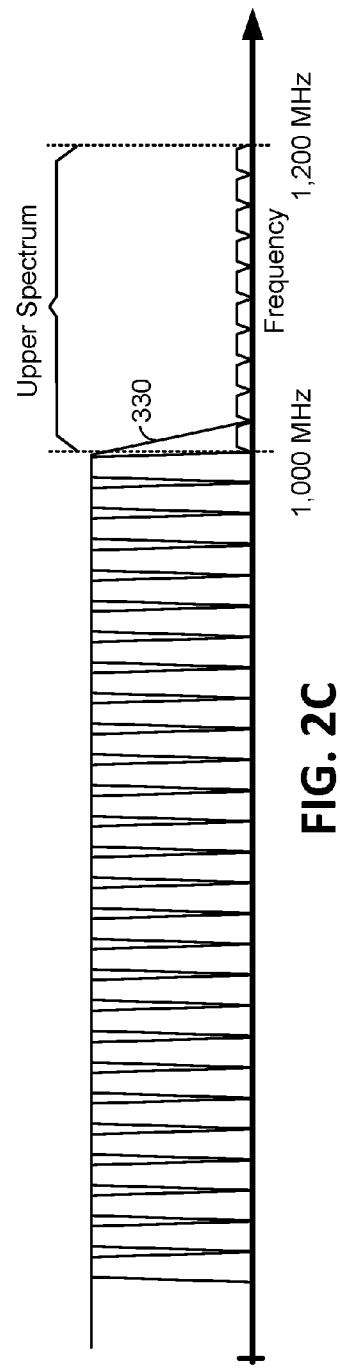
FIG. 2C is a graph illustrating the channelization of a DOCSIS 3.1 downstream signal after filtering according to the present embodiment to attenuate channels in an upper spectrum so that the filtered signal does not interfere with a MoCA signal.

FIG. 2C is a graph illustrating the channelization of a DOCSIS 3.1 downstream signal after filtering according to the present embodiment to attenuate channels in an upper spectrum so that the filtered signal does not interfere with a MoCA signal. As shown, a spectrum 330 of the DOCSIS 3.1 downstream signal after digital filtering according to the present invention has its channels in the upper spectrum attenuated by −40 to −60 dBc. With the embodiment of FIG. 2C, a transition band is from 1000 to 1125 MHz and has a bandwidth of approximately 125 MHz. The DOCSIS 3.1 DS signal after digital filtering has a power spectrum 330 of P(total)=15 dBmV+10 log(149 channels)=37 dBmV. The filtered DOCSIS 3.1 DS signal is then coupled to the in home cabling 112 and/or 130. After filtering, the DOCSIS 3.1 DS signal does not interfere with the MoCA D-Band signal. Note that FIG. 2C would also apply to DOCSIS 3.0 signaling and to other DOCSIS standards with similar channelization.

Figure 3:
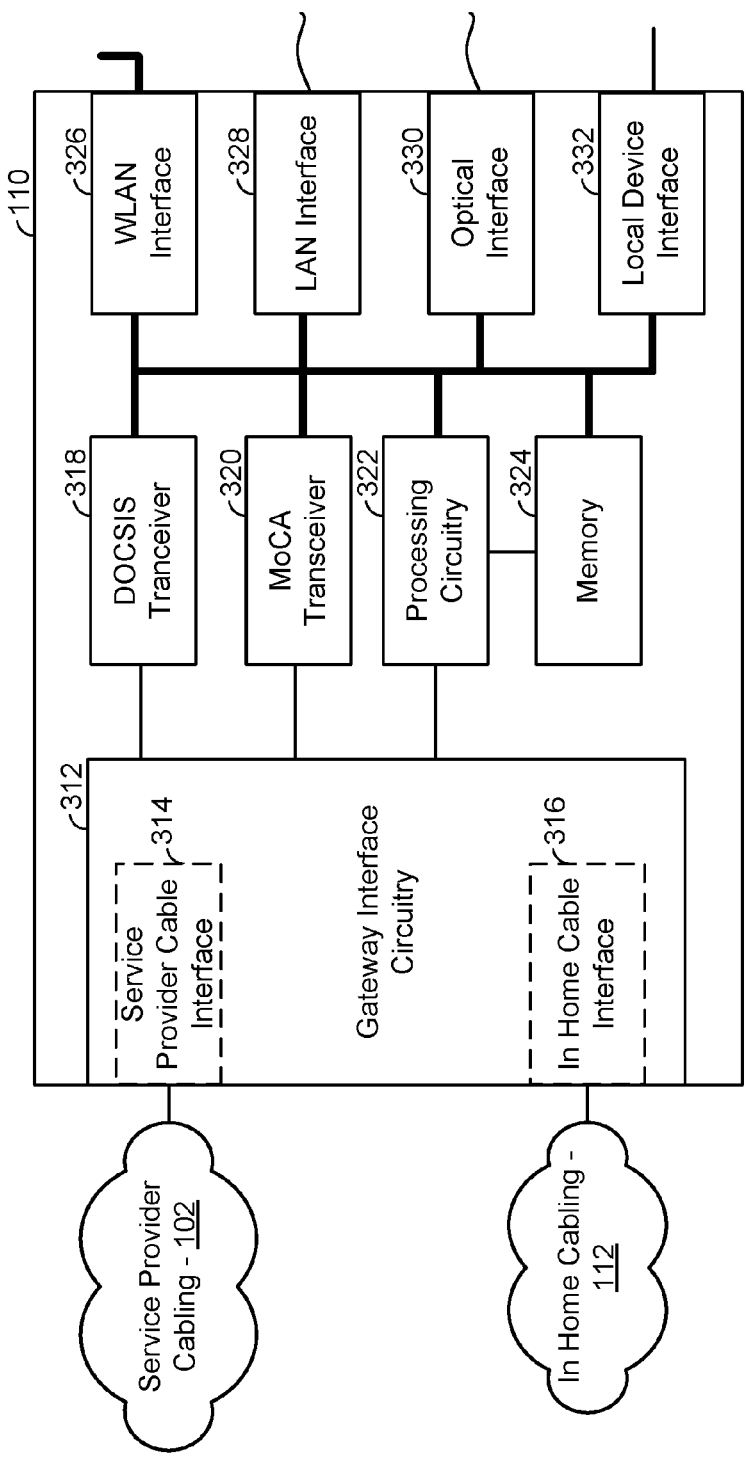
FIG. 3 is a block diagram illustrating a cable network gateway that may be installed in a home or other premises and that is constructed according to one or more embodiments of the present disclosure.

FIG. 3 is a block diagram illustrating a cable network gateway that may be installed in a home or other premises and that is constructed according to one or more embodiments of the present disclosure. The cable network gateway 110 includes gateway interface circuitry 312 that includes a service provider cable interface 314 and an in home cable interface 316. The service provider cable interface 314 is configured to receive a downstream broadband signal via service provider cabling 102. The gateway interface circuitry is configured to convert the downstream broadband signal to a digital downstream broadband signal and to digitally filter the digital downstream broadband signal to attenuate an upper spectrum to produce a filtered digitized downstream broadband signal. A MoCA transceiver 320 is configured to produce a digital in-home communications signal that overlaps the upper spectrum. The gateway interface circuitry 312 is further configured to sum the filtered digitized downstream broadband signal with the digital in-home communications signal to produce a combined digital signal. The gateway interface circuitry further includes a Digital to Analog Converter (DAC) configured to convert the combined digital signal to a combined analog signal. Once converted, the gateway interface circuitry 312 couples, via an in home cable interface 316, the combined analog signal via in-home cabling 112.

In one embodiment, the downstream broadband signal is a DOCSIS 3.1 format signal and the digital in-home communications signal is a MoCA format signal. Further, with one or more embodiments, the upper spectrum is approximately 1,000 to 1,200 MHz (as shown in FIG. 2C). The gateway interface circuitry 312 may also include a bandpass filter configured to filter the digital in-home communications signal. Such structure also applies to other DOCSIS standards having similar channelization as DOCSIS 3.1.

The cable network gateway 110 may also include a DOCSIS transceiver 318, processing circuitry 322, and memory 324. The memory 324 may store instructions, network data, audio content, and video content. Thus, the cable network gateway 110 may serve as network storage, video storage, and/or audio storage. The cable network gateway 110 may also include a Wireless Local Area Network (WLAN) interface 326, a Wired Local Area Network (LAN) interface 328, an optical interface 330, or a local device interface 332. Thus, the cable network gateway 110 may provide Internet access via one or more of these interfaces and may serve audio and/or video via one of these interfaces. The cable network gateway 110 may also provide Internet access via one of these interfaces.

Figure 4:
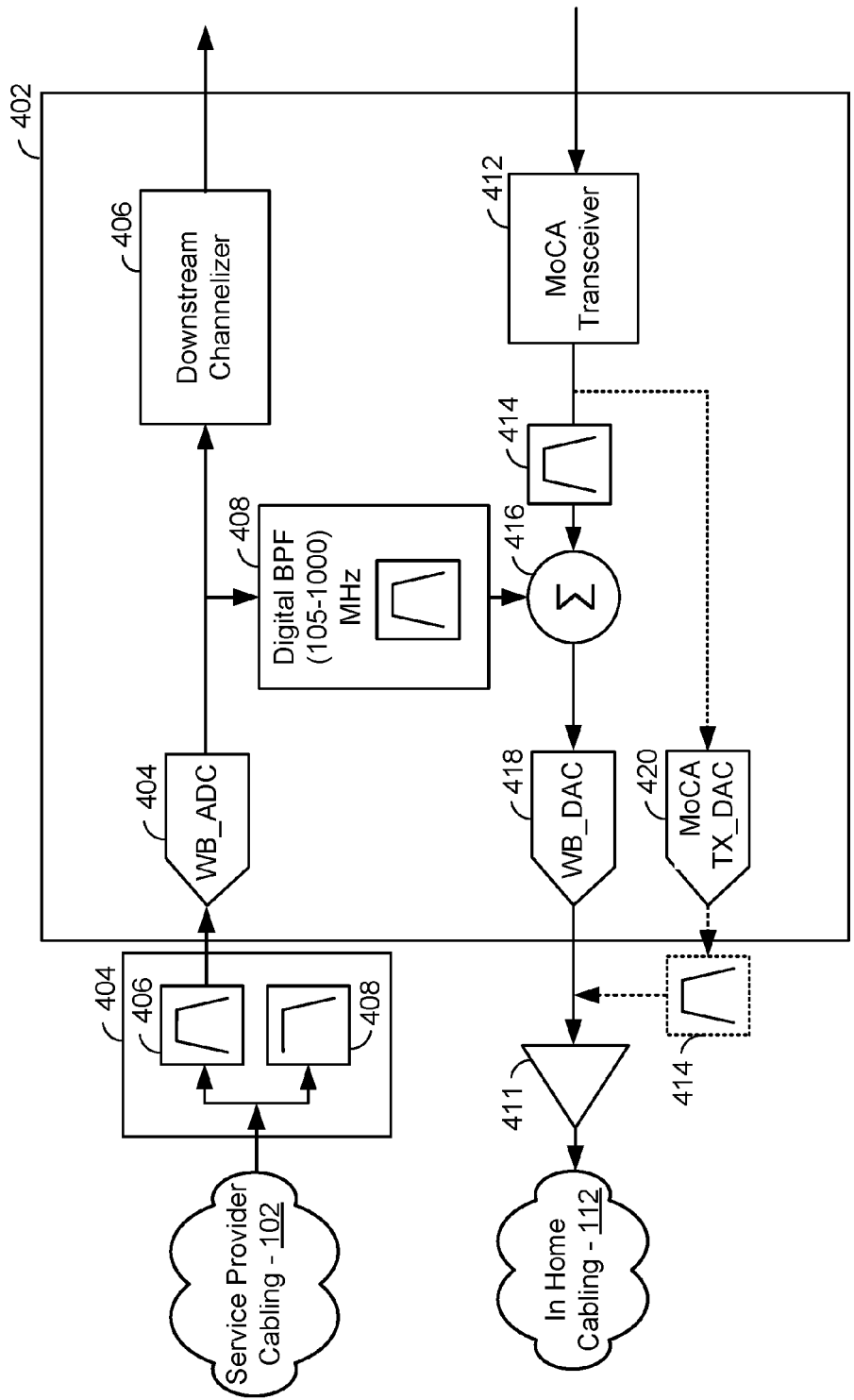
FIG. 4 is a block diagram illustrating gateway interface circuit constructed and operating according to the present disclosure.

FIG. 4 is a block diagram illustrating gateway interface circuit 402 constructed and operating according to the present disclosure. The cable network gateway integrated circuit 402 may be formed on a single integrated circuit, packaged as a single device, or formed on multiple integrated circuits. The cable network gateway integrated circuit 402 couples to the service provider cabling 102 via a di-plexer 404 that includes a bandpass filter 406 to allow a downstream broadband signal to pass and that includes a low pass filter 408 to shunt frequencies above the spectrum of the downstream (and upstream) broadband signal. The cable network gateway integrated circuit 402 couples to the in home cabling 112 via an amplifier 411.

The cable network gateway integrated circuit 402 includes a wideband Analog to Digital Converter (ADC) 404 configured to receive the downstream broadband signal (e.g., DOCSIS 3.0 DS signal or DOCSIS 3.1 DS signal) and to convert the downstream broadband signal to a digital downstream broadband signal. The cable network gateway integrated circuit 402 includes a digital filter 408 configured to attenuate an upper spectrum from the digital downstream broadband signal to produce a filtered digitized downstream broadband signal. In one embodiment, the digital filter 408 is a band pass filter with a pass band of 105-1000 MHz consistent with the spectrum of FIG. 2C.

The cable network gateway integrated circuit 402 further includes an in-home communications transceiver 412 (MoCA transceiver) configured to produce a digital in-home communications signal that overlaps the upper spectrum. A bandpass filter 414 filters the digital in-home communications signal. Summing circuitry 416 is configured to sum the filtered digitized downstream broadband signal with the digital in-home communications signal to produce a combined digital signal. A Digital to Analog Converter (DAC) 418 is configured to convert the combined digital signal to a combined analog signal and to transmit the combined analog signal by coupling it to the amplifier 411.

An optional transmit path for the digital in-home communications signal includes a TX DAC 420 and external bandpass filter 414, which couples its output to the amplifier 411. The cable network gateway integrated circuit 402 may also include a downstream channelizer 406 configured to channelize the filtered digitized downstream broadband signal. The output of the downstream channelizer 406 is received by a DOCSIS transceiver to extract data therefrom. The MoCA transceiver 412 receives outgoing data from coupled processing circuitry.

Consistent with the prior description herein, the downstream broadband signal may be a DOCSIS 3.1 format signal having spectral qualities consistent with FIGS. 2A, 2B, and 2C. Further, the digital in-home communications signal may be a MoCA format signal. In such case, the upper spectrum is approximately 1000 to 1200 MHz. For simplicity in description of the present disclosure, only a portion of the cable network gateway integrated circuit 402 components are shown. In other embodiments, additional components, e.g., DOCSIS 3.0/3.1 US components, and MoCA receive components are included. Further, various other components, such as those illustrated in FIG. 3 may also be included, including other communication interfaces, processing circuitry, memory, etc.

Figure 5:
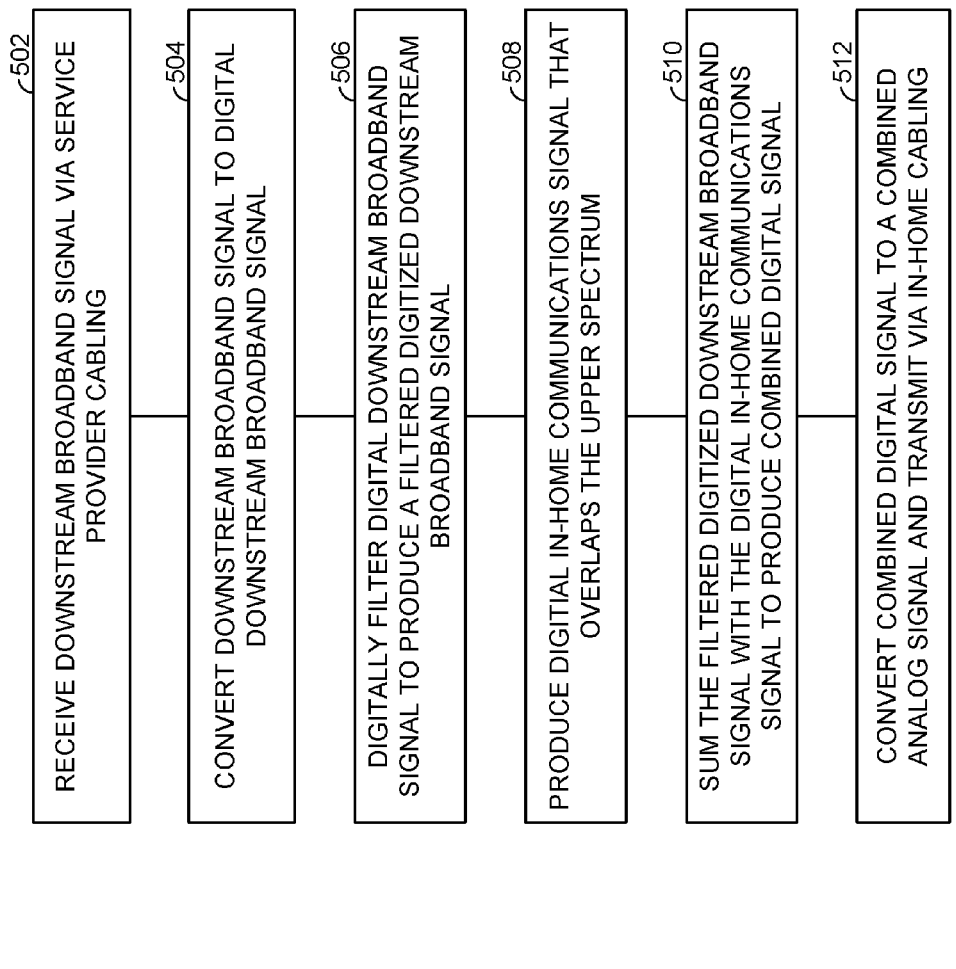
FIG. 5 is a flow chart illustrating operation of a device according to the present disclosure.

FIG. 5 is a flow chart illustrating operation of a device according to the present disclosure. The method 500 commences with a cable modem gateway or other device receiving a downstream broadband signal via service provider cabling (Step 502). In one embodiment, the downstream broadband signal is a DOCSIS 3.0/3.1 format signal. Operation continues with the cable modem gateway converting the downstream broadband signal to a digital downstream broadband signal (Step 504). Step 504 may be performed by an ADC. Operations further include low pass filtering the digital downstream broadband signal to produce a filtered digitized downstream broadband signal (Step 506). Next, operations include producing a digital in-home communications signal that overlaps the upper spectrum (Step 508). The digital in-home communications signal may be a MoCA format signal that occupies the 1150-1500 MHz band. Then, the operations include summing the filtered digitized downstream broadband signal with the digital in-home communications signal to produce a combined digital signal (Step 510). The method 500 then includes converting the combined digital signal to a combined analog signal and transmitting the combined analog signal via in-home cabling (Step 512). Note that step 512 may be performed in separate operations.

With the method 500 of FIG. 5, the upper spectrum is approximately 1,000 to 1,200 MHz in some embodiments. The method 500 may further include band-pass filtering the digital in-home communications signal. Further, the method 500 may also include processing the digital downstream broadband signal to service at least one of WLAN communications, LAN communications, streamed video communications, streamed audio communications, optical communications, or local device communications. Moreover, operations may include channelizing the filtered digitized downstream broadband signal.

The present disclosure has been described, at least in part, in terms of one or more embodiments. An embodiment of the present disclosure is used herein to illustrate the present disclosure, an aspect thereof, a feature thereof, a concept thereof, and/or an example thereof. A physical embodiment of an apparatus, an article of manufacture, a machine, and/or of a process that embodies the present disclosure may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The present disclosure has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed disclosure. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A cable network gateway comprising:
   a service provider cable interface configured to receive a downstream broadband signal via service provider cabling;
   an Analog to Digital Converter (ADC) configured to convert the downstream broadband signal to a digital downstream broadband signal;
   a digital filter having an input coupled to an output of the ADC, and configured to attenuate at least an upper portion of a spectrum included in the digital downstream broadband signal to produce a filtered digitized downstream broadband signal;
   a downstream channelizer including an input coupled to the output of the ADC and an output coupled to a Data over Cable System Interface Specification (DOCSIS) transceiver, the downstream channelizer configured to produce a channelized filtered signal from the filtered digitized downstream broadband signal;
   an in-home communications transceiver configured to produce a digital in-home communications signal that overlaps the upper portion of the spectrum;
   summing circuitry configured to sum the filtered digitized downstream broadband signal with the digital in-home communications signal to produce a combined digital signal;
   a Digital to Analog Converter (DAC) configured to convert the combined digital signal to a combined analog signal;
   an in-home cable interface configured to transmit the combined analog signal via in-home cabling; and
   a transmit path coupling the digital in-home communications signal to the in-home cable interface.

2. The cable network gateway of claim 1, wherein the downstream broadband signal comprises a Data over Cable System Interface Specification (DOCSIS) 3.0/3.1 format signal.

3. The cable network gateway of claim 1, wherein the digital in-home communications signal comprises a Multimedia over Coaxial Alliance (MoCA) format signal.

4. The cable network gateway of claim 1, wherein the upper portion of the spectrum comprises approximately 1,000 to 1,200 MHz.

5. The cable network gateway of claim 1, further comprising a band-pass filter configured to filter the digital in-home communications signal.

6. The cable network gateway of claim 1, further comprising at least one of:
   a Wireless Local Area Network (WLAN) interface;
   a Wired Local Area Network (LAN) interface;
   an optical interface; or
   a local device interface.

7. The cable network gateway of claim 1, further comprising a downstream channelizer configured to channelize the filtered digitized downstream broadband signal.

8. A method for servicing cable communications comprising:
   receiving a downstream broadband signal via service provider cabling;
   converting the downstream broadband signal to a digital downstream broadband signal using a wide-band analog to digital converter;
   low pass filtering the digital downstream broadband signal, using a digital filter having an input coupled to an output of the wide-band analog to digital converter, to attenuate an upper portion of a spectrum of the digital downstream broadband signal to produce a filtered digitized downstream broadband signal;
   generating a channelized filtered signal from the filtered digitized downstream broadband signal using a downstream channelizer having an input coupled to the output of the wide-band analog to digital converter and an output coupled to a Data over Cable System Interface Specification (DOCSIS) transceiver;
   receiving a first signal from a local network interface at an in-home communications transceiver;
   producing a digital in-home communications signal from the first signal, the digital in-home communications signal overlapping the upper portion of the spectrum;
   summing the filtered digitized downstream broadband signal with the digital in-home communications signal to produce a combined digital signal;
   converting the combined digital signal to a combined analog signal; and
   transmitting the combined analog signal via in-home cabling.

9. The method of claim 8, wherein the downstream broadband signal comprises a Data over Cable System Interface Specification (DOCSIS) 3.0/3.1 format signal.

10. The method of claim 8, wherein the digital in-home communications signal comprises a Multimedia over Coaxial Alliance (MoCA) format signal.

11. The method of claim 8, wherein the upper portion of the spectrum comprises approximately 1,000 to 1,200 MHz.

12. The method of claim 8, further comprising band-pass filtering the digital in-home communications signal.

13. The method of claim 8, further processing the digital downstream broadband signal to service at least one of:
   Wireless Local Area Network (WLAN) communications;
   Wired Local Area Network (LAN) communications;
   streamed video communications;
   streamed audio communications
   optical communications; or
   local device communications.

14. The method of claim 8, further comprising channelizing the filtered digitized downstream broadband signal.

15. A cable network gateway integrated circuit comprising:

an Analog to Digital Converter (ADC) configured to receive a downstream broadband signal and to convert the downstream broadband signal to a digital downstream broadband signal;

a digital filter having an input coupled to an output of the ADC, and configured to attenuate at least an upper portion of a spectrum of the digital downstream broadband signal to produce a filtered digitized downstream broadband signal;

a downstream channelizer including an input coupled to the output of the ADC and an output coupled to a DOCSIS transceiver, the downstream channelizer configured to produce a channelized filtered signal from the filtered digitized downstream broadband signal;

an in-home communications transceiver configured to produce a digital in-home communications signal that overlaps the upper portion of the spectrum;

summing circuitry configured to sum the filtered digitized downstream broadband signal with the digital in-home communications signal to produce a combined digital signal;

a Digital to Analog Converter (DAC) configured to convert the combined digital signal to a combined analog signal and to transmit the combined analog signal; and a transmit path coupling the digital in-home communications signal to the in-home cable interface, wherein the transmit path bypasses the summing circuitry.

16. The cable network gateway integrated circuit of claim 15, wherein the downstream broadband signal comprises a Data over Cable System Interface Specification (DOCSIS) 3.0/3.1 format signal.

17. The cable network gateway integrated circuit of claim 15, wherein the digital in-home communications signal comprises a Multimedia over Coaxial Alliance (MoCA) format signal.

18. The cable network gateway integrated circuit of claim 15, wherein the upper portion of the spectrum comprises approximately 1,000 to 1,200 MHz.

19. The cable network gateway integrated circuit of claim 15, further comprising a band-pass filter configured to filter the digital in-home communications signal.

20. The cable network gateway integrated circuit of claim 15, further comprising a downstream channelizer configured to channelize the filtered digitized downstream broadband signal.

* * * * *